United States Patent [19]
Stender

[11] Patent Number: 5,088,687
[45] Date of Patent: Feb. 18, 1992

[54] BALL VALVE SEAT FOR HIGH TEMPERATURE SERVICE

[76] Inventor: Carl H. Stender, 10709 Timbergrove Ln., Corpus Christi, Tex. 78410

[21] Appl. No.: 585,297

[22] Filed: Sep. 19, 1990

[51] Int. Cl.⁵ ............................................. F16K 5/06
[52] U.S. Cl. .................................. 251/174; 251/315
[58] Field of Search ............................... 251/174, 315

[56] References Cited

U.S. PATENT DOCUMENTS

| | | |
|---|---|---|
| 3,488,033 | 1/1970 | Priese ................................ 251/184 X |
| 3,497,176 | 2/1970 | Priese . |
| 3,521,855 | 7/1970 | Jensen . |
| 3,617,025 | 11/1971 | Gerbic . |
| 3,741,523 | 6/1973 | Scaramucci et al. . |
| 3,940,107 | 2/1976 | Allenbaugh, Jr. .............. 251/315 X |
| 4,004,776 | 1/1977 | Stender . |
| 4,111,393 | 9/1978 | McClurg et al. . |
| 4,126,295 | 11/1978 | Natalizia . |
| 4,258,901 | 3/1981 | Zinni et al. ...................... 251/174 X |
| 4,290,581 | 9/1981 | Moran et al. .................... 251/174 X |
| 4,385,747 | 5/1983 | Renaud, Jr. et al. . |
| 4,580,762 | 4/1986 | Hirtz et al. ...................... 251/118 X |
| 4,660,591 | 4/1987 | Brown et al. . |
| 4,899,980 | 2/1990 | Kemp ............................... 251/174 X |

*Primary Examiner*—John C. Fox
*Attorney, Agent, or Firm*—Head & Johnson

[57] ABSTRACT

A ball valve seat for high temperature and/or abrasive fluids includes a disc-like spring portion formed as a part of the seat for maintaining a sealed relationship with the valve body and the ball and thus allowing for expansion and contraction of the valve components.

22 Claims, 3 Drawing Sheets

BALL VALVE SEAT FOR HIGH TEMPERATURE SERVICE

BACKGROUND OF THE INVENTION

This invention relates generally to improvements to ball valves. More particularly, but not by way of limitation, this invention relates to an improved valve seat.

A ball valve consists of a valve body having a ball receiving cavity with aligned inlet and outlet passages leading to and from the cavity. A ball with an opening formed therethrough is rotatably supported in the cavity between the inlet and outlet passages. Means is provided for rotating the ball to an open position wherein its opening is aligned with the inlet and outlet passages in an open position and to a closed position where the opening is out of alignment with the inlet and outlet passages. Sealing between the ball and the body is accomplished by two ring-shaped seats located in the valve body on opposite sides of the cavity for engagement with the ball and which define a portion of the inlet and outlet passages respectively. These seats each have sealing surfaces for engagement with the ball on one side and the valve body on the other. A wide variety of seat materials and designs have been proposed in the prior art, many of which use elastomeric materials which are incapable of utilization in handling fluids in abrasive, chemical, or high-temperature environments. For instance, in a high-temperature situation, i.e. temperatures above 800° F., elastomeric materials are destroyed. In addition, because of the high-temperature environment of the fluids, sufficient allowance for the expansion of the valve body, the ball valve and its seats are not adequately provided for.

SUMMARY

It is an object of this invention to provide a ball valve and valve seat ring construction that overcomes the disadvantages of the known prior art devices.

It is an object of this invention to provide an improved ball valve of the type mentioned above which can operate in many extreme environmental conditions such as extremely corrosive fluid media and high-temperature applications where existing valve seat materials would normally be destroyed.

Specifically, the invention provides for a ball valve having a valve body. The valve body includes a ball receiving cavity with aligned inlet and outlet passages leading to and from said cavity. A ball is rotatably supported in the cavity between the inlet and outlet passages and has an opening therethrough which, in the full open position, is in coaxial alignment with the inlet and outlet passages. Inlet side and outlet side ring-shaped seats are located and positioned in the valve body on opposite sides and in sealed contact with the ball. The central inner surface of the seat defines a portion of the inlet and outlet passages respectively. Each of the seats is defined by a ball side and a valve body side. Each of the seats making up the invention comprises a concave seating surface on the ball side to sealably engage with the ball. A circular transverse groove is positioned around the outer periphery of the seat between the ball and the body side creating a circumferential plate-like spring. A bead is formed around the outer surface of the body side for sealable contact therewith. The effect is to provide an assembly wherein each of the seats has a built-in spring-like expansion characteristic to allow for the expansion and contraction that will occur, for example, in high-temperature operation, for example.

DETAILED DESCRIPTION OF THE PREFERRED EMBODIMENT

Before explaining the present invention in detail, it is to be understood that the invention is not limited in its application to the details of the construction and arrangement of parts illustrated in the accompanying drawings. The invention is capable of other embodiments and of being practiced or carried out in a variety of ways. It is to be understood that the phraseology and terminology employed herein is for the purpose of description and not of limitation.

Figure 1:
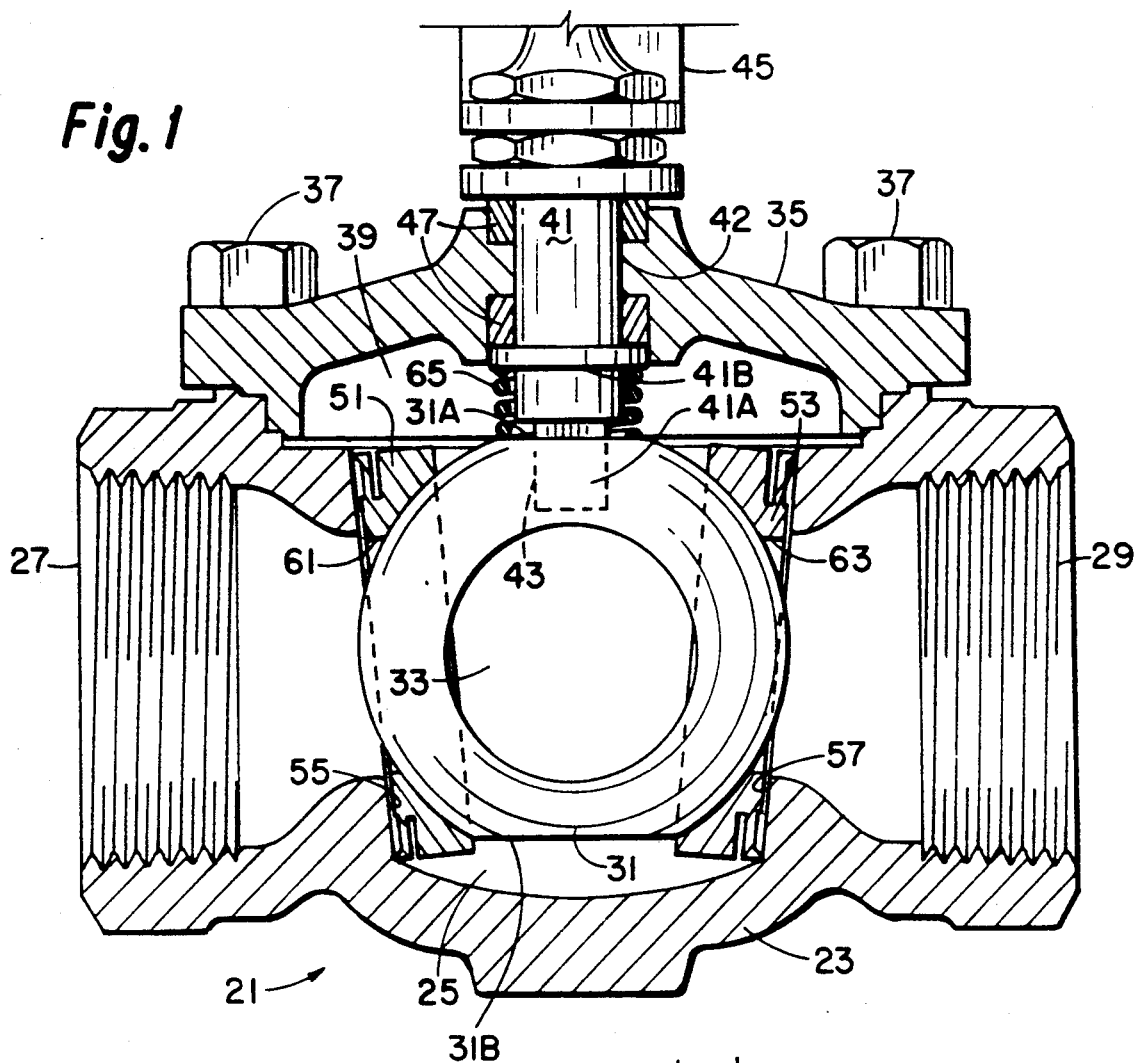
FIG. 1 is a cross-sectional view of the ball valve of this invention.

Referring now to FIG. 1, the ball valve is identified at 21. It comprises a valve body 23 having a ball receiving cavity 25 with aligned inlet and outlet passages 27 and 29, respectively, leading to and from the cavity. A ball 31 is rotatably supported in the cavity between the inlet and outlet passages. The ball has an opening or passageway 33 formed therethrough. In one position of the ball, it is in co-axial alignment with the inlet and the outlet positions. A cover or bonnet 35 is connected to the top of the valve body by way of bolts 37. The cover defines a chamber 39 to which the top of the ball is exposed. A stem 41 extends through an aperture 42 formed in the top of the cover and to the chamber 39 where its lower end 42 is fitted into an opening or socket 43 formed in the top of the ball. The cross-section of the lower end 42 of the stem and the opening or socket 43 is rectangular such that rotation of the stem 42 causes the ball to rotate from the open position to the closed position. The top of the stem 41 is splined to a handle 45 such that rotation of the handle rotates the stem and hence the ball 31. Seals 47 are located around the stem on opposite sides of the cover 35.

Two ring-shaped seats 51 and 53 are supported on opposite sides of the cavity for engaging opposite sides of the ball respectively for forming a seat between the seats and the ball. The backside of the seats engage with shoulders 55 and 57 of the valve body for forming a seat between the back sides of the seat and the valve body. The inside surfaces 61 and 63 of the seats 51 and 53 define a portion of the inlet and outlet passages. As illustrated, the seats 51 and 53 are I5 supported at an angle relative to the vertical, and the ball is biased in places within the seats by way of a coil spring 65. The top of the spring 65 engages the shoulder 41B of the stem while the bottom of the spring engages the top 31A of the ball 31, which has been machined flat. The bottom 31B of the ball 31 has also been machined flat. The spring compensates for ball and seat wear in that the spring pressure maintains the ball in the seats which in turn are biased in the valve body. In order to increase the effective sealing lifetime of the ball valve, improvements have been made to the valve. These include the formation of a harder surface on the ball; the formation of harder ball seats; and the formation of a close tolerance fit between the ball and its seat.

The ball is spherical except for the top and bottom which are machined flat and the sides where the aperture 33 extends through the ball. The ball body may be formed of carbon steel and/or high temperature resistive alloys. Most grades of steel, chrome-nickel alloys and other alloys may be used, depending upon the particular process requirements.

The hardness of the surface of the ball is increased by coating it with a thin layer of hard ceramic material, which in the preferred embodiment is chrome oxide, which may be applied in accordance with the known plasma spray process. After the ball has been coated, it usually is not perfectly round and is lapped to remove the high spots. The coating thickness is of the order of 0.0075 of an inch, which is sufficient to allow the high spots of the coating to be removed without removing all of the coating down to the base metal. The lapping process is described in U.S. Pat. No. 4,004,776.

Figure 2:
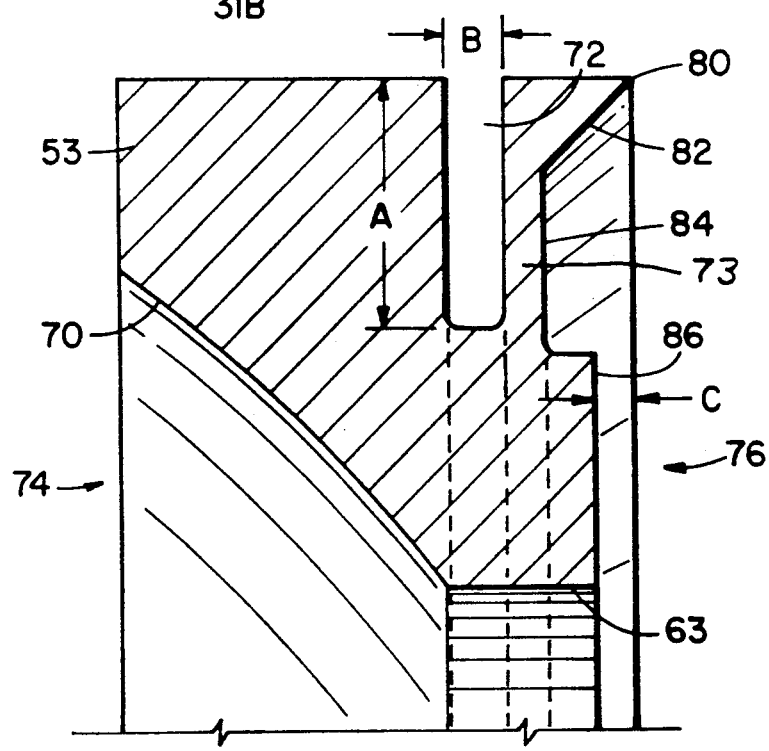
FIGS. 2, 3, and 4 are enlarged cross-sectional views of a portion of one of the ring-shaped seats depicting the several embodiments therefor.
Figure 3:
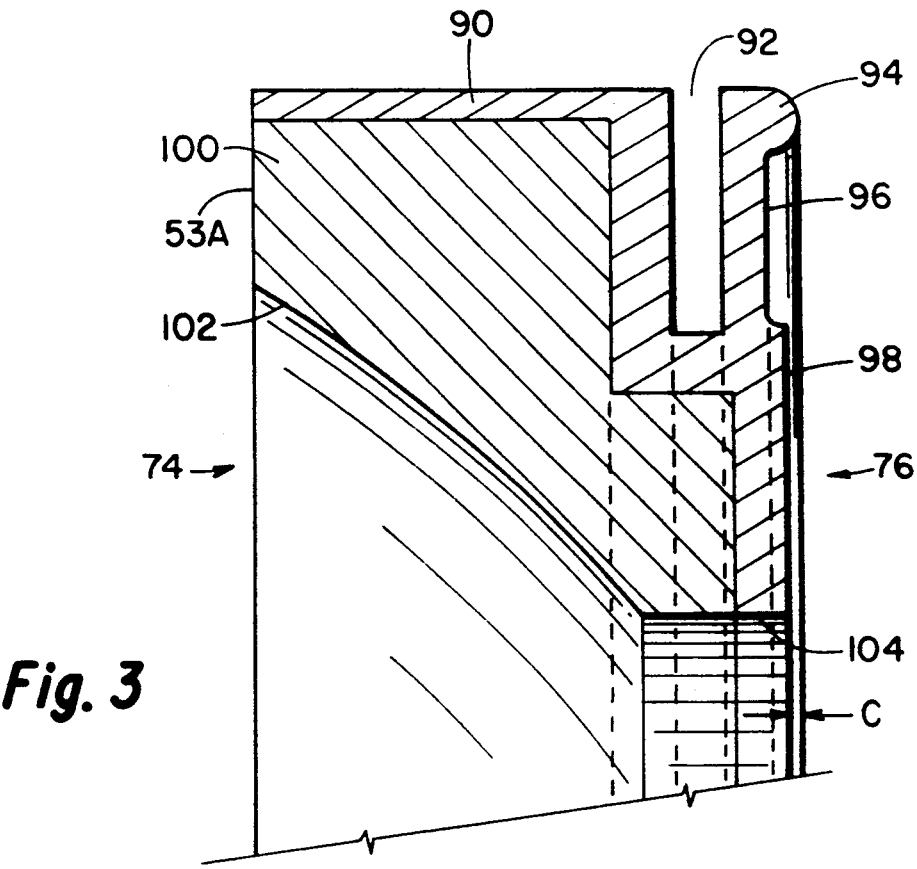
Figure 4:
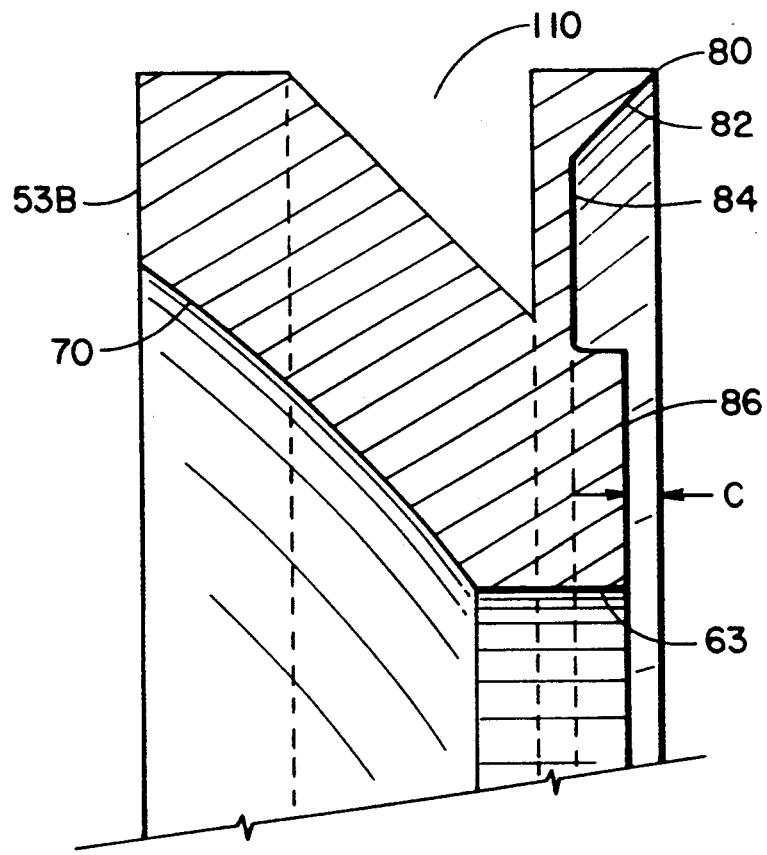
Figure 5:
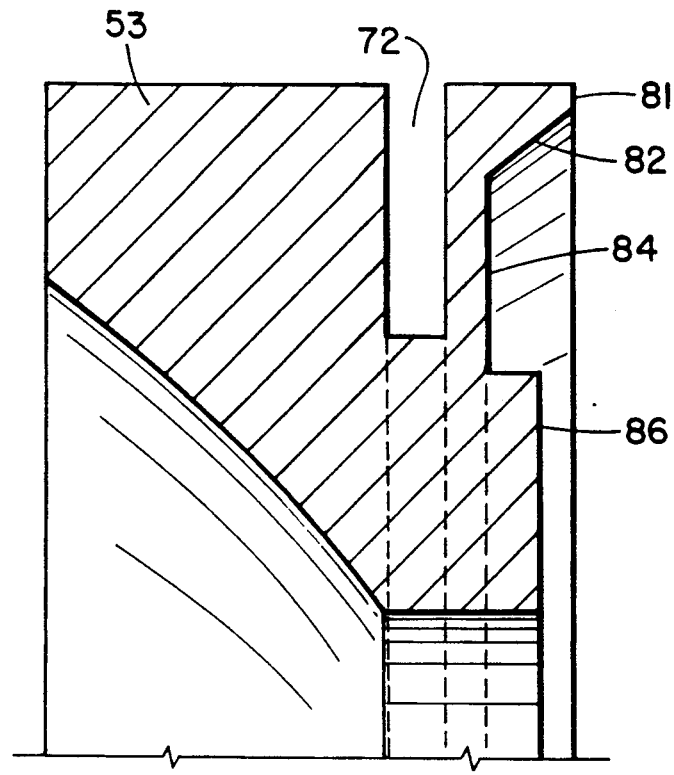
FIG. 5 is a partial enlargement of a lapped bevel as used in this invention.
Figure 6:
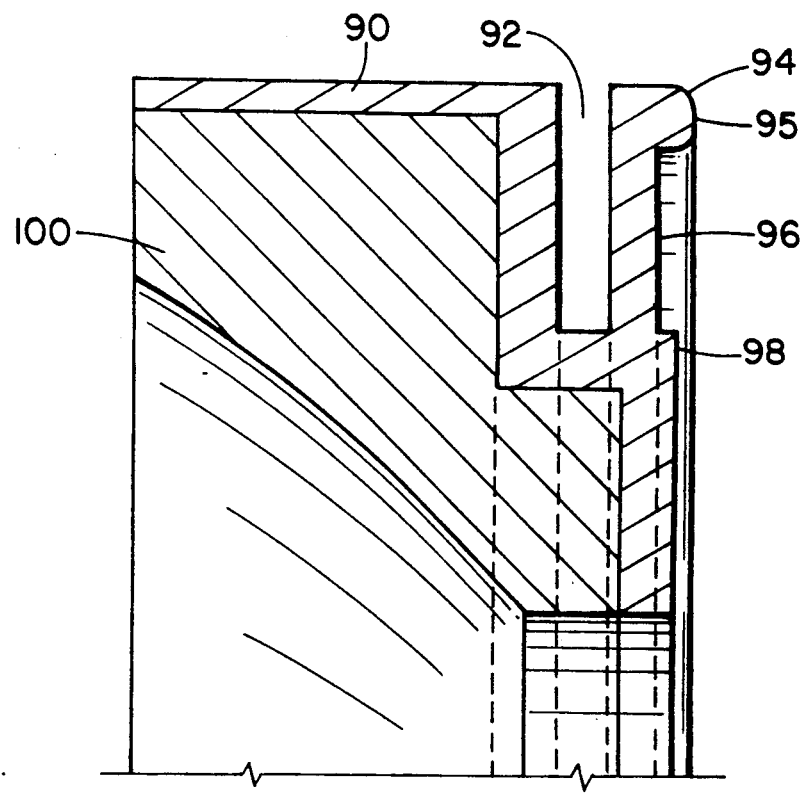
FIG. 6 is a partial enlargement of a lapped bead as used in this invention.

The ring-shaped seats 51 and 53 and the various embodiments thereof are more aptly described in FIGS. 2, 3, and 4 herein. In most cases the seats comprise 17-4 stainless steel or other 300 series stainless. The seats can also be constructed of Inconel, titanium, or other alloys for the particular service intended. In the embodiment shown in FIG. 2, the seat 53 comprises a concave seating surface 70 which is machined to sealably engage with the surfaces of the ball 31. A groove 72 is formed in the outer periphery thereof between what is identified herein as the ball side generally designated as 74 and the valve body side generally designated by the numeral 76. The groove 72 in this non-limiting embodiment is transverse to the axis of the valve seat and longer than it is wide creating a circumferential plate-like spring 73. The width of the spring is typically within the range of 0.030 to 0.125 inches, depending on the groove depth which depends on the valve seat size. The length of the groove is typically in the order of 0.25 to 0.313 inches while the width thereof is within the range of 0.035 to 0.045 inches, depending on the size of valve. A bead or rim 80 is formed around the outer surface for contact with the valve body surfaces 55 and 57 The bead 80 in this instance takes the form of a bevel surface 82. The bead 80, when lapped, creates a small flat surface 81 (FIG. 5) which is especially desirable in use with dry or abrasive particle service. A groove 84 is formed at the terminus of the bevel 82 and between a flat portion 86 which is spaced from the outer edge of the bead 80 a distance within the range of 0.015 to 0.20 inches which, again, largely depends upon the size of the valve and further provides spring-like expansive relief of the valve seat without breaking the sealed engagement of seat-to-ball to body relationship during extreme environmental usages. It is to be understood that the bead 80 may be formed of the beveled concept as shown in FIG. 2 or a rounded bead as shown in FIG. 3 as lapped forms flat surface 95 (FIG. 6).

Referring now to FIG. 3, the seat 53A is comprised of two unitized metallic portions. An outside ring 90 has groove 92 therein, bead surface 94, circular groove 96, and plane surface 98 within which is insert portion 100. In this embodiment, insert 100 is formed of cast iron pressed into the stainless steel ring 90 and there machined to form the concave surface 102 for sealable engagement with the ball. The inside circular surface 104 defines the outlet passageway in the position of the seat shown in this invention, and with the seat reversed, this portion becomes a portion of the inlet passageway.

FIG. 4 is an additional embodiment of the invention—the primary distinction being the size and shape of the groove 110 with all other aspects of the valve seat being shown in FIG. 2.

In assembling the ball valve, the ball and seats are inserted into the cavity of the valve body as a unit. The bonnet and stem assembly are then aligned such that the stem fits into the socket of the ball, and the bonnet is held in place by bolts 37. In the assembled position, the seats 51 and 53 are located in the cavity on opposite sides thereof, as illustrated, in alignment with the inlets and outlets of the valve respectively. The seating surfaces of the seats engage opposite sides of the ball while the bead portion 80 engages the surfaces 55 and 57 of the valve body. This forms a seal between the ball and the seat and the backside of the seat. That is, the seats form a seal between the ball and the valve body; and as such, the respective inlet and outlet surfaces 61 and 63 of the seats 51 and 53 form a portion of the inlet and outlet passages.

In use, especially in high-temperature conditions, i.e. 800° to 1200° F., expansion of the valve body, the ball, and the seats takes place. This expansion characteristic, of course, will depend upon the type of materials utilized for these elements. Suffice it to say that the expansion of the ball, the seats, and the body are resiliently compensated for by the groove 72 in FIG. 2, 92 in FIG. 3, and 110 in FIG. 4, along with the additional expansion capabilities provided by gap C.

What is claimed is:

1. A ball valve comprising:

a valve body having a top entry ball receiving cavity which is transverse to aligned inlet and outlet passages leading to and from said cavity;

a cover enclosing said cavity;

a rotatable valve stem sealably extending through said cover and connected to a rotatable ball supported in said cavity between said inlet and outlet passages and having an opening therethrough which, in one rotated position, is in co-axial alignment with said inlet and outlet passages;

a compression spring between said cover and said ball;

said cavity on each side of said ball defined by valve seating surfaces, each of said valve seating surfaces being canted downwardly and inwardly;

a unitary hardened all metal ring-shaped sat located in each said valve seating surface on opposite sides of and in sealed contact with said ball, a central inner surface of each said seat defining a portion of said inlet and outlet passages respectively, each seat defined by a front ball side and a back valve body side, each of said seats comprising a concave metal seating surface on said ball side to sealably engage with said ball, a groove around the outer periphery thereof between said ball and said body side, and a bead around the outer surface of said body side for sealable contact said valve seating surface, said valve body side having a co-axial groove between said bead and a co-axial flat portion, said bead extending beyond said co-axial groove and said flat portion, whereby said bead contacts said body, and said flat portion initially being spaced from said valve body.

2. The ball valve of claim 1 wherein said groove is transverse to said central inner surface of said seat.

3. ball valve of claim 2 wherein said groove is of length greater than its width.

4. The ball valve of claim 3 wherein the length of said groove is within the range of 0.25 to 0.313 inches.

5. The ball valve of claim 3 wherein the width of said groove is within the range of 0.035 to 0.045 inches.

6. The ball valve of claim 1 wherein said groove is V-shaped.

7. The ball valve of claim 1 wherein said bead is beveled shape with the apex of said bevel in contact with said body.

8. The ball valve of claim 7 wherein said apex includes a lapped flat portion.

9. The ball valve of claim 1 wherein said seat is of two unitized portions comprising an outside ring having said groove and said head and an inside portion forming said concave seating surface.

10. The ball valve of claim 9 wherein said inside portion is comprised of gray cast iron.

11. The ball valve of claim 1 wherein said bead is a rounded surface.

12. A ball valve comprising:
    a valve body having a ball receiving cavity with aligned inlet and outlet passages leading to and from said cavity;
    a ball rotatable supported in said cavity between said inlet and outlet passages and having an opening therethrough which, in one position, is in co-axial alignment with said inlet and outlet passages;
    first and second ring-shaped seats located in said valve body on opposite sides of and in sealed contact with said ball, a central inner surface of each said seats defining a portion of said inlet and outlet passages respectively, each seat defined by a front, ball side and a back, valve body side,
    each of said seats comprising,
    a concave seating surface on said ball side to sealably engage with said ball,
    a groove around the outer periphery thereof between said ball side and said valve body side,
    a bead around the outer surface of said valve body side for contact therewith,
    said valve body side having a co-axial groove between said bead and a co-axial flat portion, said bead extending beyond said coaxial groove and said flat portion whereby said bead contacts said body, and said flat portion initially being spaced from said valve body.

13. The ball valve of claim 9 wherein said groove is transverse to the coax is of said seat.

14. The ball valve of claim 13 wherein said groove is of length greater than its width.

15. The ball valve of claim 14 wherein the length of said groove is within the range of 0.25 to 0.313 inches.

16. The ball valve of claim 14 wherein the width of said groove is within the range of 0.035 to 0.045 inches.

17. The ball valve of claim 9 wherein said groove is V-shaped.

18. The ball valve of claim 9 wherein said bead is beveled shape with the apex of said bevel in contact with said body.

19. The ball valve of claim 18 wherein said bead includes a lapped flat portion.

20. The ball valve of claim 9 wherein said seat is of two unitized portions comprising an outside ring having said groove and said bead and an inside portion forming said concave seating surface.

21. The ball valve of claim 20 wherein said inside portion is comprised of cast iron.

22. The ball valve of claim 12 wherein said bead is a rounded surface.

* * * * *